United States Patent [19]

Robb et al.

[11] Patent Number: 5,147,629
[45] Date of Patent: Sep. 15, 1992

[54] PROCESS FOR PRODUCTION OF NUCLEI FOR USE IN TITANIUM DIOXIDE MANUFACTURE

[75] Inventors: John Robb, Stockton on Tees; Ian G. Dobson, Northallerton, both of England

[73] Assignee: Tioxide Group Services Limited, United Kingdom

[21] Appl. No.: 743,685

[22] Filed: Aug. 12, 1991

[30] Foreign Application Priority Data

Aug. 16, 1990 [GB] United Kingdom ............ 9018034

[51] Int. Cl.⁵ ............................................ C01G 23/04
[52] U.S. Cl. ............................. 423/612; 423/610; 423/615
[58] Field of Search ............. 423/610, 611, 612, 615; 106/436

[56] References Cited

U.S. PATENT DOCUMENTS

| | | | |
|---|---|---|---|
| 3,859,115 | 1/1975 | Wiseman et al. | 106/430 |
| 4,944,936 | 7/1990 | Lawhorne | 423/612 |
| 4,988,495 | 1/1991 | Wiederhöft | 423/616 |
| 5,024,827 | 6/1991 | Jones et al. | 423/611 |

FOREIGN PATENT DOCUMENTS

| | | | |
|---|---|---|---|
| 778685 | 2/1968 | Canada | 423/611 |
| 806588 | 2/1969 | Canada | 423/611 |
| 376031 | 7/1990 | European Pat. Off. . | |
| 2504037 | 8/1975 | Fed. Rep. of Germany . | |
| 823400 | 4/1981 | U.S.S.R. . | |
| 384875 | 12/1932 | United Kingdom | 423/612 |
| 549326 | 11/1942 | United Kingdom . | |
| 568232 | 3/1945 | United Kingdom | 423/612 |
| 1206227 | 9/1970 | United Kingdom | 423/612 |
| 1500021 | 2/1978 | United Kingdom . | |

*Primary Examiner*—Michael Lewis
*Assistant Examiner*—Steven Bos
*Attorney, Agent, or Firm*—Baker & Botts

[57] ABSTRACT

A process for the production of a suspension of nuclei has been developed in which an aqueous mixture of titanium tetrachloride, aluminium ions and hydroxyl ions is cured at at temperature of from 50° to the boiling point. The pH of the suspension before or after curing has a value of from 6.5 to 10.5. The aqueous mixture is prepared by mixing a solution of titanium tetrachloride with a solution of a base, e.g. sodium hydroxide and aluminium hydroxide.

When used to nucleate hydrolysis in the "sulphate" process a large crystal size anatase pigment is produced.

15 Claims, No Drawings

PROCESS FOR PRODUCTION OF NUCLEI FOR USE IN TITANIUM DIOXIDE MANUFACTURE

This invention relates to a production process and particularly to a process for the production of a nuclei suspension.

The manufacture of titanium dioxide pigment by the so-called "sulphate process" has become well established producing the two types of pigment, anatase titanium dioxide and the more valuable and technically important rutile titanium dioxide.

The pigmentary properties of rutile titanium dioxide make the pigment the preferred one but anatase does possess a higher degree of whiteness and brightness which are important in certain uses.

Consequently it would be advantageous if anatase titanium dioxide could be made with, at least some improved pigmentary properties.

In the sulphate process a titaniferous ore is digested with concentrated sulphuric acid and the cake obtained is dissolved in weak acid or water to produce a solution of titanyl sulphate. This solution is eventually hydrolysed in the presence of nuclei to precipitate hydrous titanium dioxide which is calcined to produce the chosen product.

The particular form of the nuclei and in particular the method of preparation of the nuclei suspension is important in influencing the form of the titanium dioxide pigment eventually produced.

The present invention relates to a process for the preparation of a nuclei suspension which when used in the sulphate process produces improved anatase titanium dioxide pigment.

According to the present invention a process for the production of a nuclei suspension comprises forming an aqueous mixture of titanium tetrachloride, aluminium ions and hydroxyl ions, curing the mixture at a temperature in the range 50° C. to the boiling point of the mixture, cooling the mixture and, if necessary, adjusting the pH of the mixture to a value within the range 6.5 and 10.5.

Also according to the invention a process for the manufacture of anatase titanium dioxide pigment comprises forming an aqueous solution of titanyl sulphate and heating said solution in the presence of a nuclei suspension prepared according to the immediately preceding paragraph to precipitate hydrous anatase titanium dioxide and calcining the hydrous anatase titanium dioxide precipitated to produce anatase titanium dioxide in pigmentary form.

nuclei produced by the method of the invention when used in the production of titanium dioxide pigment produce anatase titanium dioxide of a size greater than that currently produced by the sulphate process and which has improved properties associated with this larger size such as increased refractive index. The products of the invention preferably have at least 90% by weight and preferably at least 95% by weight of the $TiO_2$ in the anatase form.

Generally speaking, the nuclei suspension is obtained by mixing an aqueous solution of titanium tetrachloride with a source of aluminium ions and hydroxyl ions and subsequently curing at a temperature of from 50° C. to the boiling point of the mixed solution. Usually the solution of titanium tetrachloride is mixed with a solution of a base and aluminium hydroxide.

The aqueous solution of titanium tetrachloride can be prepared by any suitable process but preferably is prepared either from a purified titanium tetrachloride or from reagents which will yield a titanium tetrachloride relatively free from metallic impurities having coloured oxides such as oxides of iron, manganese, vanadium and chromium etc. Generally speaking the aqueous solution of titanium tetrachloride is prepared by forming a mixture of anhydrous tetrachloride with cold water and maintaining the temperature of the mixture below that at which precipitation of titanium compounds occurs by thermal hydrolysis. Usually the temperature is maintained at below about 70° C., preferably below 40° C. Usually the anhydrous titanium tetrachloride is added to cold water at a slow rate. A wide range of concentrations of titanium tetrachloride can be obtained by this method.

While the aqueous solution of titanium tetrachloride used can have a wide range of concentration preferably the solution contains from 700 to 1500 grams per liter of $TiCl_4$ and most preferably from 900 to 1000 gpl.

The aqueous solution of titanium tetrachloride is then mixed with the source of aluminium and hydroxyl ions and usually the aqueous solution is at least partially neutralised by the addition thereto of an aqueous solution of a base and aluminium hydroxide. The said aqueous solution of a base can be prepared by dissolving a suitable aluminium compound in an aqueous solution of a base containing hydroxyl ions. Alternatively to the aqueous solution of titanium tetrachloride there is added separately a base and a source of aluminium ions.

The aqueous solution of aluminium ions and hydroxyl ions is preferably prepared by dissolving anhydrous aluminium hydroxide in an aqueous solution of an alkali metal hydroxide preferably sodium hydroxide.

One way of obtaining the appropriate aqueous solution containing aluminium ions and hydroxyl ions is to dissolve aluminium hydroxide in its anhydrous form in a solution of sodium hydroxide in amounts such that the ratio $Na_2O:Al_2O_3$ on a weight basis is in the range 3:1 to 9:1. Typically when prepared the solution contains a total weight of sodium hydroxide and the aluminium salt expressed as oxides $Na_2O$ and $Al_2O_3$ of from 40 to 60 grams per liter of solution.

In the process of the invention for the manufacture of a nuclei suspension after the formation of the aqueous mixture of titanium tetrachloride, aluminium ions and hydroxyl ions the mixed solution has a pH of at least 2, preferably at least 3.5 prior to effecting curing. If desired, however, all the required amount of base or alkali can be added at this stage to produce a pH in the range 6.5 to 10.5.

The aqueous mixture after preparation usually has a temperature below 70° C., preferably below 50° C. and after preparation is maintained at a temperature from 50° C. and the boiling point of the mixture for a period at least 15 minutes, e.g. 30 minutes to effect curing of the nuclei suspension. Normally the mixed solution is maintained at the chosen temperature, preferably in the range 70° C. to 90° C. after being raised to the chosen temperature at a slow rate. A rate of heating of say 0.5° to 2° C. per per minute is suitable but preferably a rate of heating at 0.75° C. to 1.25° C. per minute is employed. The cured aqueous dispersion of nuclei is then cooled by quenching with water and, if desired, diluted with wash water.

The dispersion, if necessary, is treated with a further addition of a base or alkali to raise the pH to a value of from 6.5 to 9.5 prior to settlement and separation by decantation of the prepared nuclei concentrated suspension or dispersion.

The nuclei dispersion of the present invention is used to effect the manufacture of substantially anatase titanium dioxide pigment when employed in the well-known "sulphate" process. The nuclei dispersion or suspension is used in the hydrolysis stage of the process to direct the precipitation of anatase hydrous titanium dioxide which is subsequently calcined to produce anatase titanium dioxide. The use of the preferred suspensions of the invention has the effect of producing anatase titanium dioxide of increased size and improved pigmentary properties.

Any appropriate titaniferous ore can be used to form a solution of titanyl sulphate, typical ores being ilmenite or slag. These ores are digested in concentrated sulphuric acid to produce a digestion cake which is then dissolved in water or dilute acid to produce a solution of titanyl sulphate.

This solution containing iron sulphate, titanyl sulphate and sulphuric acid together with other impurities is usually treated with a reducing agent and filtered prior to mixing with the nuclei suspension. Amounts of nuclei within the range 0.2% to 10% or preferably up to 6% as $TiO_2$ based on the titanium content (expressed as titanium dioxide) of the solution to be hydrolysed may be employed. Preferably the amount of nuclei suspension is from 0.25% to 2.0% by weight of $TiO_2$ on weight of $TiO_2$ in the solution.

The nuclei suspension can be added to the solution of titanyl sulphate and then the mixture is heated at an elevated temperature, usually at its boiling point until substantially all the titanyl sulphate is precipitated as hydrous titanium dioxide.

The precipitated hydrous titanium dioxide is recovered by filtration, decantation or other conventional methods and after separation is duly washed with water and, if necessary, leached with small concentrations of sulphuric acid or other suitable reagents. The washed precipitate is then usually treated with one or more small additions of alkali metal e.g. potassium sulphate or ammonium compounds e.g. ammonium biphosphate and with aluminium compounds such as aluminium sulphate in amounts of from 0.2% to 0.9% by weight as oxide on $TiO_2$ content of the precipitated hydrous titanium dioxide.

The additioned precipitate is then dewatered and calcined at a temperature of from 800° C. to 1200° C. preferably at 900° C. to 950° C. for a period of from 1.5 to 3.0 hours.

The product obtained is anatase titanium dioxide which after milling in a sand mill or in a fluid energy mill can be coated with one or more hydrous metal oxides or with hydrous silica in conventional manner.

The products of the invention find use in all those conventional applications where anatase titanium dioxide is favoured and the products have an improved tinting strength coupled with excellent whiteness and brightness. Products can be obtained with crystal sizes in the range 0.20 to 0.30 micron, and standard deviation of 1.31 to 1.35, others with a particle size in the range 0.31 to 0.33 micron and with a particle size distribution (Standard Deviation) of 1.60. The products can have a tinting strength in the unmilled form of 1380 to 1420 and after sand milling have a tinting strength of 1470 to 1500. Products having a dry brightness of 5.5 to 7.5 have been obtained.

The invention is illustrated in the Examples hereinafter described in which the following general methods were used

NUCLEI PREPARATION (GENERAL METHOD)

A solution containing A grams of NaOH in B mls of water was additioned with C grams of $Al_2O_3.3H_2O$ and was stirred until clear prior to being diluted to 2 liters with water. To this solution was further added, over 10 seconds, D mls of a solution of titanium oxychloride containing the equivalent of E gpl titanium and F gpl chloride. The temperature was then raised at 1° C./minute to 82° C. where it was maintained for 30 minutes. The batch was quenched with 2.5 liters of cold water, then 5 liters of water at 60° C. were added and the pH was adjusted to 7.5. Decantation of supernatant liquor left a suspension of nuclei containing the equivalent of G gpl $TiO_2$, which was used to initiate precipitation.

PIGMENT PREPARATION (GENERAL METHOD)

2 kg of Australian ilmenite (plant milled), was digested in 3.4 kg of 91% sulphuric acid and baked for 1 hour at 180° C. The cake was dissolved in water (4500 mls) and the resulting solution was reduced using iron strips until a $Ti_2O_3$ level of 2-3 gpl was reached. The solution was flocculated and filtered after which the $Fe/TiO_2$ ratio was adjusted to H by crystallisation. The $H_2SO_4:TiO_2$ ratio was adjusted to I by addition of $H_2SO_4$ and the specific gravity at 60° C. was altered to J using water.

The liquor thus prepared was heated to 95° C. and the nuclei suspension added (K % by weight of precipitable $TiO_2$). 5% (by liquor volume) of water was added and the suspension was taken to boiling point and maintained at this temperature for a period of 3 hours. (1 hour into this period a second water addition (5%) was made). The concentration was reduced to 150 gpl $TiO_2$ and the temperature was brought to 95° C. where it was maintained for 1 hour. The slurry was filtered and washed (with 5 times the liquor volume of water). The pulp obtained was leached for 2½ hours at 70° C. in a solution containing 70 gpl $H_2SO_4$ and 1-2 gpl $Ti_2O_3$. The pulp was then conditioned with the following agents; $K_2SO_4$ L %, $Al_2(SO_4)_3$ M % and $NH_4H_2PO_4$ N % (all quoted as the oxide with respect to $TiO_2$).

The pulp was oven dried at 120° C. and then calcined at 930° C. for 2½ hours and had the following properties

| | |
|---|---|
| % Rutile | Z |
| Tinting Strength | O |
| Undertone | P |
| Dry Brightness | Q |
| Mean Crystal Size | R microns |
| Standard Deviation | S |

The calciner discharge was sandmilled at 700 gpl using 0.3% monoisopropanolamine as dispersant and subsequently coated with 0.7% $SiO_2$ and 1.5% $Al_2O_3$. 0.15% trimethylolpropane was added to the wet slurry which was then micronised to give the following properties

| | |
|---|---|
| Tinting Strength | T |
| Undertone | U |
| Dry Brightness | V |

-continued

| Mean Particle Size | W microns |
|---|---|
| i.r. reflectance (2500 nm) | X |
| water demand (g/100 g $TiO_2$) | Y |

EXAMPLES 1 to 4

The general methods were repeated using the quantities and other parameters set out in Table 1. Also given in Table 1 are the values of the properties of the products. Coating was not performed on the product of Example 2.

TABLE 1

| Variable | Exp 1 | Exp 2 | Exp 3 | Exp 4 |
|---|---|---|---|---|
| A | 73 | 87.1 | 87.1 | 87.1 |
| B | 385 | 435 | 435 | 435 |
| C | 39 | 9.75 | 9.75 | 9.75 |
| D | 180 | 191 | 140 | 191 |
| E | 267 | 251 | 342 | 251 |
| F | 568 | 488 | 688 | 488 |
| G | 38 | 37.2 | 43.5 | 37.2 |
| H | 0.53 | 0.54 | 0.55 | 0.54 |
| I | 1.87 | 1.88 | 1.84 | 1.86 |
| J | 1.617 | 1.618 | 1.620 | 1.615 |
| K | 0.35 | 0.35 | 0.35 | 0.35 |
| L | 0.23 | 0.23 | 0.22 | 0.23 |
| M | 0.22 | 0.22 | 0.19 | 0.22 |
| N | 0.21 | 0.21 | 0.21 | 0.21 |
| O | 1390 | 1410 | 1390 | 1370 |
| P | Blue 4 | Blue 3 | Blue 5 | Blue 4 |
| Q | 6½ | — | 5½ | — |
| R | 0.22 | — | 0.22 | 0.27 |
| S | — | — | 1.32 | 1.33 |
| T | 1490 | — | 1500 | 1490 |
| U | Blue 7 | — | Blue 8 | Blue 4 |
| V | — | — | 10 | 9 |
| W | — | — | 0.31 | 0.33 |
| X | 88%[1] | — | 39%[2] | 55%[2] |
| Y | — | — | 21.0 | 21.5 |
| Z | 0.7 | 1.4 | 2.6 | 2.4 |

[1]Calciner discharge
[2]Final pigment

EXAMPLE 5

A 10 m³ tank was charged with 0.14 m³ of caustic sodium aluminate (at 260 gpl NaOH and 95 gpl $Al_2O_3$). 0.47 m³ of sodium hydroxide solution at 310 gpl was added followed by 3.6 m³ of water after which stirring commenced. When the solution was suitably agitated, 0.4 m³ of a solution of $TiCl_4$ containing Ti (101 gpl) and Cl (196 gpl) was added over a period of 15 seconds. Steam was applied to heat the reaction mixture to 82° C. at 1° C./min and to maintain this temperature for a further 30 minutes. The batch was then quenched with 5.1 m³ of cold water and subsequently neutralised to pH 7.5 using sodium hydroxide solution. The contents of the tank were pumped to a settling tank where 10.2 m³ of warm quench water was administered. Settling yielded the large crystal anatase nuclei at 26 gpl.

A portion of these plant-scale prepared nuclei was used in a sulphate process precipitation as follows. A sample of fresh plant sulphate liquor ($H_2SO_4$ 350 gpl, $TiO_2$ 188 gpl and $FeSO_4$ 322 gpl) was heated to 95° C. and 0.35% of the prepared nuclei (nuclei $TiO_2$/liquor $TiO_2$ basis) was added. 5% (by liquor volume) of water was added and the suspension was heated to the boiling point and boiled for 3 hours (one hour into this period, a second water addition (5%) was made). The concentration was reduced to 150 gpl $TiO_2$ and the temperature adjusted to, and maintained for one hour at 95° C. The slurry was filtered and washed with water and the pulp was leached according to the general method. Calcination was conducted in the presence of three conditioning agents: $K_2SO_4$ 0.23%, $Al_2(SO_4)_3$ 0.22% and $NH_4H_2PO_4$ 0.21% (all w/w as the oxide).

The pigment, produced after calcination (2½ hours at 930° C.) in a rotary muffle furnace, had the following properties:

| % R | 0.0% |
|---|---|
| Tinting Strength | 1360 |
| Undertone | Neutral |
| Dry Brightness | 9.5 |
| Mean Crystal Size | 0.21 microns |

A sample of pigment which had been calcined for 2½ hours at 935° C. contained 0.6% rutile with a crystal size of 0.25 microns. It was sandmilled at 700 gpl using monoisopropanolamine as dispersant, and subsequently coated with 0.7% $SiO_2$ and 1.5% $Al_2O_3$. 0.15% trimethylolpropane was added to the wet slurry which was then fluid energy milled to give the following properties:

| Tinting strength | 1460 |
|---|---|
| Undertone | Blue 5 |
| i.r. reflectance (2500 nm) | 33% |
| Contrast Ratio (Sobral P470) | 91.9 (at 20 m²/l) |
| Reflectance over black (Sobral P470) | 84.1 (at 20 m²/l) |

EXAMPLE 6

A range of suncreams was prepared using various titanium dioxide products as set out:

| $TiO_2$ Product | Characteristics |
|---|---|
| AA | rutile $TiO_2$ acicular, crystal size 20 nm × 100 nm coated with approx 11.5 $Al_2O_3$ and 4.5 $SiO_2$. |
| BB | uncoated anatase spherical, crystal size 150 nm. |
| CC | uncoated rutile, spherical, crystal size 200 nm. |
| DD | prepared according to the process herein described, uncoated anatase spherical, crystal size 250 nm. |

These $TiO_2$ products were each incorporated into suncream at a level of 5% and 10% together with one suncream free of $TiO_2$ product as follows:

| Suncream No. | $TiO_2$ Product | % |
|---|---|---|
| 1 | AA | 5 |
| 2 | AA | 10 |
| 3 | BB | 5 |
| 4 | BB | 10 |
| 5 | CC | 5 |
| 6 | CC | 10 |
| 7 | DD | 5 |
| 8 | DD | 10 |
| 9 | NONE | 0 |

The general formulation of a suncream containing 5% by weight of the $TiO_2$ product is given below. The formulation is adjusted proportionally for the suncreams containing 10% by weight of the TiO2 product. Each sample of $TiO_2$ product was used as a 40% by weight dispersion in a 1:1 mixture of mineral oil and caprylic/capric triglyceride (MOTG) and an organic dispersing agent and the amount given in the formulation is the weight of the 40% dispersion. For example 12.50 parts by weight of the 40% dispersion contains 5% by weight of the TiO$_2$ product on weight of suncream.

| FORMULATION FOR 5% SUNCREAM | |
|---|---|
| | % W/W |
| PHASE A | |
| Stearic acid | 2.00 |
| Glycomul S (Span 60) (Sorbitan stearate) | 2.50 |
| Glycosperse S20 (Tween 60) (Polysorbate 60) | 3.50 |
| Teginacid H (Glyceryl stearate [and] Ceteth 20) | 7.50 |
| Emulgator E2155 | 2.50 |
| Antaron V-220 (PVP-eicosene copolymer) | 2.00 |
| Dimethicone 200/350 (Dow-Corning) | 0.50 |
| TiO$_2$ product dispersion | 12.50 |
| Mineral oil/triglyceride (MOTG) 1:1 extra amount | 3.50 |
| PHASE B | |
| Water, deionised | 53.89 |
| Triethanolamine | 0.35 |
| Carbopol 951 (2% solution) (Carbomer 951) | 7.00 |
| PHASE C | |
| Propylene glycol | 2.00 |
| Nipastat (Alkyl esters of 4-hydroxy benzoic acid) | 0.15 |
| Sorbic acid | 0.10 |
| Bronopol (2-bromo 2-nitropropane 1,3-propandiol) | 0.01 |

MANUFACTURE

Heat phases A and B separately to 80° C.
Add phase A to phase B whilst stirring slowly
Begin cooling with stirring. At 55° C., emulsify until smooth and glossy, approximately 1 minute
Cool to 45° C. with stirring. Add preservatives
Stir cool to 35° C.

The suncreams were tested to determine their Infra-red reflecting capacity (IRRC) as follows. 4 mg/cm$^2$ of the suncream was spread unidirectionally and homogenously on a black glass plate. Measurments were subsequently made under constant conditions of temperature and relative humidity (22° C. and 65° C.).

The measurements of the reflected light were identical to those described by Leveque, Poelman, Le Gall and De Rigal, Dermatologica 1985, 170, 12.

The amount of reflected IR was measured firstly on the uncovered plate (Q$_0$) and subsequently on the plate covered with suncream (Q). The values obtained were expressed in arbitrary units, the least being obtained from the uncovered black plate (Q$_0$) which was considered as the standard.

25 measurements were made for each formulation.

The results were expressed as IRRC and corresponded to the mean of 25 measurements.

| Suncream | IRRC |
|---|---|
| 1 | 2.02 ± 0.23 |
| 2 | 2.05 ± 0.14 |
| 3 | 2.50 ± 0.58 |
| 4 | 2.44 ± 0.24 |
| 5 | 2.87 ± 0.64 |
| 6 | 4.33 ± 0.97 |
| 7 | 2.87 ± 0.64 |
| 8 | 4.73 ± 0.97 |
| 9 | 1.48 ± 0.13 |

As the IRRC values were >1 all the products tested reflect IR Radiations.

Suncreams 8 and 6 exhibit the best reflecting power. From the studies and under these conditions, it was assumed that if 1 < IRRC < 2 then 10-20% IR are reflected
2 < IRRC < 3 then 20-30% IR are reflected
3 < IRRC < 5 then 30-50% IR are reflected
5 < IRRC < 10 then 50-100% IR are reflected.

Therefore the suncream formulation containing 5% large crystal anatase reflects approx. 20-30% of infra-red radiation, and that containing 10% large crystal anatase reflects 30-50% of infra-red radiation.

It is interesting to note that all the suncreams containing the TiO$_2$ products reflected at least 10-20% of infra-red radiation, regardless of whether the TiO$_2$ was fine crystal or large crystal, spherical or acicular, and rutile or anatase.

However, as the crystal size of the TiO$_2$ is increased the IR attenuation increases. Previous results have shown that for TiO$_2$, fine crystal sizes of approximately 20-100 nm scatter ultra-violet radiation very well, pigmentary crystal sizes of approximately 200 nm scatter visible radiation well and now it is shown that large crystal sizes of approx 250 nm scatter infra-red radiation well.

It has been found that the efficacy of TiO$_2$-containing suncreams in attenuating ultra-violet rays is also very dependent on formulation ingredients and method of preparation.

It is expected therefore that a similar effect could be seen with attenuation of IR radiation, and that a suncream formulation optimised for large crystal anatase could give even better protection against IR radiation.

This infra-red reflecting TiO$_2$ would be suitable for use in suncreams and other cosmetics such as daily moisturisers, foundation creams, lipsticks and other colour cosmetics.

We claim:

1. A process for the production of a nuclei suspension comprising forming an aqueous mixture of titanium tetrachloride, aluminium ions and hydroxyl ions, curing the mixture at a temperature in the range 50° C. to the boiling point of the mixture, cooling the mixture and, when the mixture has a pH value outside the range 6.5 to 10.5, adjusting the pH value to be within said range.

2. A process according to claim 1 in which the aqueous mixture is prepared by mixing a solution of titanium tetrachloride with a solution of a base and aluminium hydroxide.

3. A process according to claim 2 in which the solution of titanium tetrachloride is an aqueous solution containing from 700 to 1500 grams per liter of TiCl$_4$.

4. A process according to claim 3 in which the aqueous solution contains from 900 to 1000 grams per liter of TiCl$_4$.

5. A process according to claim 2 in which the solution of a base and aluminium hydroxide is an aqueous solution prepared by dissolving an aluminium compound in an aqueous solution of a base containing hydroxyl ions.

6. A process according to claim 2 in which the aqueous solution of a base and aluminium hydroxide is prepared by dissolving aluminium hydroxide in anhydrous form in an aqueous solution of sodium hydroxide in amounts such that the ratio Na$_2$O:Al$_2$O$_3$ on a weight basis is in the range 3:1 to 9:1.

7. A process according to claim 2 in which the aqueous solution of a base and aluminium hydroxide contains a total weight of sodium hydroxide and aluminium hydroxide expressed as oxides Na$_2$O and Al$_2$O$_3$ of from 40 to 60 grams per liter of solution.

8. A process according to claim 1 in which the aqueous mixture after formation and prior to curing has a pH of at least 2.

9. A process according to claim 1 in which an amount of a base is added to the aqueous mixture prior to curing to raise the pH to a value in the range 6.5 to 10.5.

10. A process according to claim 1 in which the aqueous mixture after formation and prior to curing has a temperature below 70° C.

11. A process according to claim 10 in which the temperature is below 50° C.

12. A process according to claim 1 in which the aqueous mixture is cured by maintaining at a curing temperature of from 50° C. and the boiling point of the aqueous mixture for a period of at least 15 minutes.

13. A process according to claim 12 in which the curing temperature is from 70° C. to 90° C. and the temperature of the aqueous mixture is raised to said curing temperature at a rate of from 0.5° to 2° C. per minute.

14. A process according to claim 1 further comprising adding said nuclei suspension to an aqueous solution of titanyl sulphate, heating said nuclei-containing solution to precipitate hydrous anatase titanium dioxide and calcining the hydrous anatase titanium dioxide precipitated to produce anatase titanium dioxide in pigmentary form.

15. A process according to claim 14 in which the amount of nuclei suspension is such as to provide nuclei in the range 0.2% to 10% as $TiO_2$ based on the titanium dioxide content of the solution of titanyl sulphate.

* * * * *